US012689317B2

(12) United States Patent
Prasad et al.

(10) Patent No.: US 12,689,317 B2
(45) Date of Patent: Jul. 21, 2026

(54) MIXED CHEMISTRY BATTERY PACK POWER TRANSFER USING A MULTILEVEL T-TYPE INVERTER

(71) Applicant: GM Global Technology Operations LLC, Detroit, MI (US)

(72) Inventors: Rashmi Prasad, Troy, MI (US); Chandra S. Namuduri, Troy, MI (US); Junghoon Kim, Ann Arbor, MI (US); Yilun Luo, Ann Arbor, MI (US); Khorshed Mohammed Alam, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 234 days.

(21) Appl. No.: 18/506,452

(22) Filed: Nov. 10, 2023

(65) Prior Publication Data

US 2025/0158552 A1    May 15, 2025

(51) Int. Cl.
*H02P 27/08*    (2006.01)
*B60L 15/00*    (2006.01)
*B60R 16/033*    (2006.01)
*H02J 7/34*    (2006.01)

(52) U.S. Cl.
CPC ............ *H02P 27/08* (2013.01); *B60R 16/033* (2013.01); *H02J 7/342* (2020.01); *B60L*

*15/007* (2013.01); *B60L 2210/10* (2013.01); *H02J 2207/20* (2020.01)

(58) Field of Classification Search
CPC .. B60L 53/22; B60L 1/00; B60L 50/60; B60L 3/00; B60L 15/007; B60L 3/0038; B60L 53/124; H02P 27/08; H02P 29/024; H02M 3/158; H02M 1/08; H02M 1/32; B60K 1/04
See application file for complete search history.

(56) References Cited

U.S. PATENT DOCUMENTS

| | | | | |
|---|---|---|---|---|
| 2022/0105793 | A1* | 4/2022 | Sukhatankar | ......... B60W 30/19 |
| 2025/0088131 | A1* | 3/2025 | Suzuki | .................... H02P 21/22 |

\* cited by examiner

*Primary Examiner* — Said Bouziane
(74) *Attorney, Agent, or Firm* — CANTOR COLBURN LLP

(57) ABSTRACT

A vehicle system includes a first battery pack connected to a second battery pack via T-type multi-level inverter. The multi-level inverter has a plurality of inverter legs, with each inverter leg being arranged in a T-type topology. A motor is connected to the multi-level inverter and a controller is connected to the motor and the multi-level inverter. The controller including a memory storing instructions configured to cause the controller to control the multi-level inverter as a direct current (DC)-DC converter such that a circulating current passes through the motor, the first battery pack and the second battery pack.

20 Claims, 6 Drawing Sheets

MIXED CHEMISTRY BATTERY PACK POWER TRANSFER USING A MULTILEVEL T-TYPE INVERTER

INTRODUCTION

The subject disclosure relates to balancing and transferring power between mixed chemistry battery packs using a multi-level inverter operating as a direct current (DC)-DC converter.

Vehicles, including electric and hybrid electric vehicles, feature battery storage systems for purposes such as powering electric motors, electronics and other vehicle subsystems. Batteries for the battery storage system typically include multiple distinct power cells, each of which stores power for later distribution. The power cells are electrically connected to provide an output power to a power distribution bus on demand. During, or shortly after charging the battery storage system it is desirable to ensure that the power is properly distributed between the battery packs in order to ensure optimal operation of the battery storage systems. Existing systems utilize the same cell types (referred to as chemistries) within the battery pack. Cells of the same type can be balanced using passive power balancing techniques.

Different types of battery packs have different properties, such as charge rates and power density. It can be advantageous in some constructions to utilize distinct types of battery packs within a single battery system, thereby allowing different vehicle operational modes to take advantage of the different battery characteristics. Utilizing distinct battery pack types within a single battery storage system, however, renders power transfer between the battery packs, as well as power balancing, difficult and the existing passive balancing systems are unable to effectively transfer power between the battery packs of different chemistries.

Accordingly, it is desirable to provide an active power balancing system for a vehicle battery storage system including battery packs of multiple distinct types.

SUMMARY

In one exemplary embodiment a vehicle system includes a first battery pack connected to a second battery pack via T-type multi-level inverter having a plurality of inverter legs. Each inverter leg is arranged in a T-type topology. A motor is connected to the T-type multi-level inverter. A controller is connected to the motor and the T-type multi-level inverter. The controller includes a memory storing instructions configured to cause the controller to control the T-type multi-level inverter as a direct current (DC)-DC converter such that a circulating current passes through the motor, the first battery pack and the second battery pack.

In addition to one or more of the features described herein each inverter leg of the T-type multi-level inverter includes a first transistor connecting a positive node to a corresponding AC output node of the inverter leg, a second transistor connecting the corresponding AC output node to a low node, a pair of third and fourth transistors connecting the corresponding AC output node to a midpoint of a pair of DC link capacitors. Each phase of the motor is connected to a corresponding leg of the multi-level inverter.

In addition to one or more of the features described herein the motor is a four terminal motor, and controlling the T-type multi-level inverter as a DC-DC converter includes providing a first control signal to the first transistor and the second transistor of each inverter leg. The first control signal being inverted for the second transistor of each inverter leg, providing a second control signal to the third transistor and the fourth transistor of each inverter leg, with the second control signal being inverted for the fourth transistor of each inverter leg, the first control signal being modulated with a three phase DC-DC converter Pulse Width Modulation (PWM), with the PWM of each inverter leg being phase shifted from each other inverter leg by 120 degrees.

In addition to one or more of the features described herein the motor is a three terminal motor. Controlling the T-type multi-level inverter as a DC-DC converter includes, for each of a first inverter leg and a second inverter leg providing a first control signal to the first and the second transistor with the first control signal being inverted for the first transistor of each inverter leg and providing a second control signal to the third transistor and the fourth transistor of the first and second inverter leg with the second control signal being inverted for the third transistor of each of the first and second inverter leg. The first control signals and the second control signals control an open/closed state of the first, second, third and fourth transistor of the corresponding phase via pulse width modulation. The modulated first control signal and the modulated second control signal in each inverter leg are phase shifted from each other inverter leg's modulated first control signal and modulated second control signal by 180 degrees. A third control signal is provided to the first, second, third and fourth transistor of the third inverter leg, the third control signal sets the first, second, third, and fourth transistor to off for a duration of controlling the T-type multi-level inverter as the DC-DC converter. The third inverter leg is connected to a positive terminal of the first battery pack.

In addition to one or more of the features described herein the first battery pack and the second battery pack are connected in parallel at one or both of a negative battery terminal and a positive battery terminal.

In addition to one or more of the features described herein the first battery pack and the second battery pack are connected in series via a common node.

In addition to one or more of the features described herein a neutral node connecting each phase of the motor is connected to the common node of the first battery pack and the second battery pack.

In addition to one or more of the features described herein a phase terminal of the of the motor is connected to the common node of the series connected battery packs.

In addition to one or more of the features described herein the motor is a three-terminal motor, a first inverter leg is physically disposed closer to the first battery pack and closer to the second battery pack than each of the second inverter leg and the third inverter leg, and wherein the first inverter leg is connected to a positive terminal of the first battery pack during DC-DC converter operations.

In addition to one or more of the features described herein the motor is a three-terminal motor, and wherein a first leg of the three multi-level inverter legs is connected to a positive DC bus via a first switch, a neutral return node of the first leg is connected to a neutral via a second switch and connected to a positive terminal of the first battery pack via a third switch.

In addition to one or more of the features described herein the first battery pack comprises at least a first set of power cells and a second set of power cells connected to the first set of power cells at the low node.

In another exemplary embodiment a method for transferring power between a first battery pack and a second battery pack of a vehicle system includes causing a controller to control a T-type multi-level inverter as a direct current (DC)-DC converter such that a circulating current passes through the T-type multi-level inverter, a motor having three phases, a first battery pack and a second battery pack. The first battery pack is connected to the second battery pack via the T-type multi-level inverter. The motor is connected to the T-type multi-level inverter and a motor controller is connected to the motor and the T-type multi-level inverter. The motor controller including a memory storing instructions configured to cause the vehicle system to implement the method.

In addition to one or more of the features described herein the T-type multi-level inverter includes three inverter legs, each inverter leg comprises a first transistor connecting a positive node to an AC output node, a second transistor connecting the AC output node to a low node, a pair of third and fourth transistors connecting the AC output node to midpoint of a pair of DC Link capacitors and wherein each phase of the motor is connected to a corresponding leg of the T-type multi-level inverter.

In addition to one or more of the features described herein the motor is a four terminal motor, and wherein controlling the T-type multi-level inverter as a DC-DC converter includes providing a first control signal to the first transistor and the second transistor of each inverter leg with the first control signal being inverted for the second transistor of each inverter leg, and providing a second control signal to the third transistor and the fourth transistor of each inverter leg, with the second control signal being inverted for the fourth transistor of each inverter leg. The first control signal being modulated with a three phase DC-DC converter Pulse Width Modulation (PWM), with the PWM of each inverter leg being phase shifted from each other inverter leg by 120 degrees.

In addition to one or more of the features described herein the motor is a three terminal motor. Controlling the T-type multi-level inverter as a DC-DC converter comprises, for each of a first inverter leg and a second inverter leg providing a first control signal to the first and the second transistor of each of the first and second inverter leg with the first control signal being inverted for the first transistor of each inverter leg and providing a second control signal to the third transistor and the fourth transistor of the first and second inverter leg. The second control signal is inverted for the third transistor of each of the first and second inverter leg. The first control signals and the second control signals control an open/closed state of the first, second, third and fourth transistor of the corresponding inverter leg via pulse width modulation (PWM). The modulated first control signal and the modulated second control signal in each inverter leg are phase shifted from the other inverter leg's first modulated control signal and second modulated control signal by 180 degrees. In addition a third control signal is provided to the first, second, third and fourth transistor of the third inverter leg, the third control signal setting the first, second, third, and fourth transistor to off for a duration of controlling the multi-level inverter as the DC-DC converter. The third inverter leg is connected to a positive terminal of the first battery pack.

In addition to one or more of the features described herein the first battery pack and the second battery pack are connected in parallel.

In addition to one or more of the features described herein the first battery pack and the second battery pack are connected in series via a battery node.

In addition to one or more of the features described herein the first battery pack is a first chemistry and the second battery pack is a second chemistry, distinct from the first chemistry.

In yet another exemplary embodiment a vehicle includes an electric drive system comprising at least one electric motor having three phases, a power distribution system comprising at least a first battery pack and a second battery pack, the power distribution system is connected to the electric drive system via a T-type multi-level inverter, and a controller is connected to the motor and the T-type multi-level inverter. The controller includes a memory storing instructions configured to cause the controller to control the T-type multi-level inverter as a direct current (DC)-DC converter such that a circulating current passes through the motor, the first battery pack and the second battery pack.

In addition to one or more of the features described herein the T-type multi-level inverter includes three inverter legs, each inverter leg of the T-type multi-level inverter includes a first transistor connecting a positive node to an AC output node, a second transistor connecting the AC output node to a low node, a pair of third and fourth transistors connecting the AC output node to the midpoint of a pair of DC Link capacitors, and each phase of the motor is connected to a corresponding leg of the T-type multi-level inverter.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
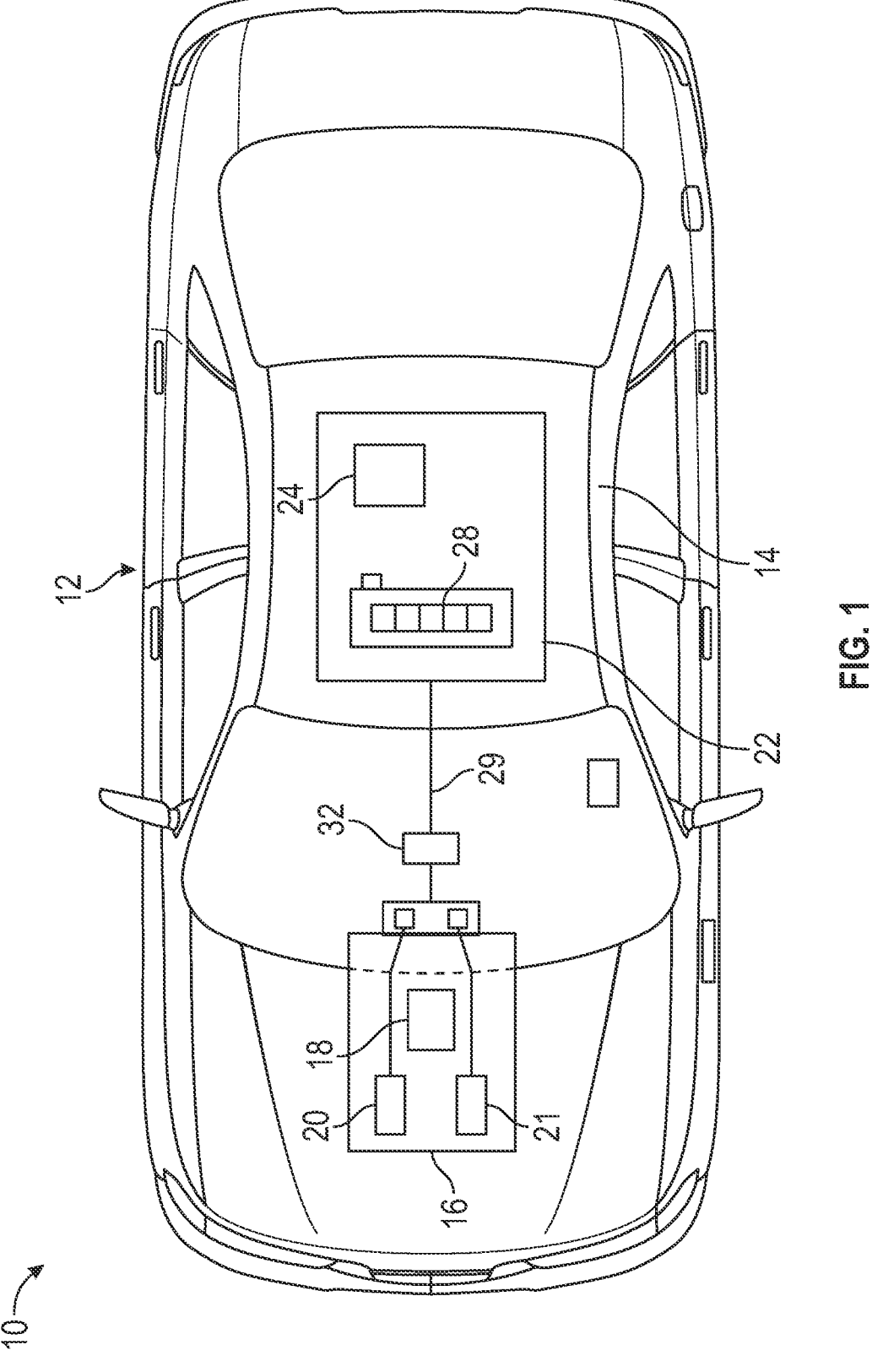
FIG. 1 is a schematic representation of a vehicle including a power distribution system.

The following description is merely exemplary in nature and is not intended to limit the present disclosure, its application or uses.

It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment a vehicle system for a battery includes multiple battery packs having distinct battery pack chemistries. A multi-level inverter converts direct current (DC) power from the battery pack into an alternating current (AC) power form that is provided to a motor and drives the motor to rotate. The characteristics of the motor rotation are controlled by the characteristics of the AC power signal. A motor controller actively controls switching within the multi-level inverter to control the characteristics of the AC power signal.

A memory is configured to cause the motor controller to implement a power balancing, or power transfer, between the distinct battery packs by operating the multi-level inverter as a DC-DC converter and utilizing the internal inductance of the motor legs without rotating the motor for the DC-DC inverter inductors. The internal inductance of the motor legs can be utilized without causing rotation by controlling the phase shift in the modulation of the AC inverter while it is operating as a DC-DC converter such that rotational forces generated by the current passing through the leg are directly countered by the rotational forces generated by the current passing through the other legs of the motor. The DC-DC converter is then able to transfer power between the battery packs according to known power transfer procedures.

In some examples, the switching incorporated to facilitate the operation in DC-DC converter mode can further be utilized to provide fault protection and/or isolation of one or more legs during a fault condition by disconnecting the leg experiencing the fault condition from the corresponding power buses.

With continued reference to the general system described above, FIG. 1 shows an embodiment of a motor vehicle 10 including a battery system controller 24 configured to control a battery system. The vehicle 10 includes a vehicle body 12 defining, at least in part, an occupant compartment 14. The vehicle body 12 also supports various vehicle subsystems including a propulsion system 16, a battery system 22, other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor assembly. For example, the propulsion system 16 includes a first electric motor 20 and a second electric motor 21. The motors 20 and 21 may be configured to drive wheels (not shown) on opposing sides of the vehicle 10. Any number of motors positioned at various additional locations about the vehicle 10 may be used to provide power to corresponding systems and subsystems.

The battery system 22 may be electrically connected to the motors 20 and 21 and/or other components, such as vehicle electronics. The battery system 22 may be configured as a rechargeable energy storage system (RESS) and includes multiple power cells partitioned into portions. A battery system controller 24 is included within the battery system 22 and controls the charging and discharging functions of the batteries within the battery system 22. In alternative configurations, the battery system controller 24 can be a general vehicle controller remote from the battery system 22 and configured to control multiple systems and/or subsystems. The general vehicle controller can be located at any position within the vehicle 10. In yet further alternatives, the battery system controller 24 can be a distributed control system including multiple coordinating controllers throughout the vehicle 10 encompassing controllers within the battery system 22 and controllers remote from the battery system 22.

In one embodiment, the battery system 22 includes one or more battery packs 28. The battery packs 28 include multiple distinct battery power cells arranged in parallel and connected to a power distribution bus 29 for providing power to one or more systems. In the exemplary system of FIG. 1, the power distribution bus 29 is illustrated in simplified form as a single line and provides power to the propulsion systems 16 through an inverter 32.

Figure 2:
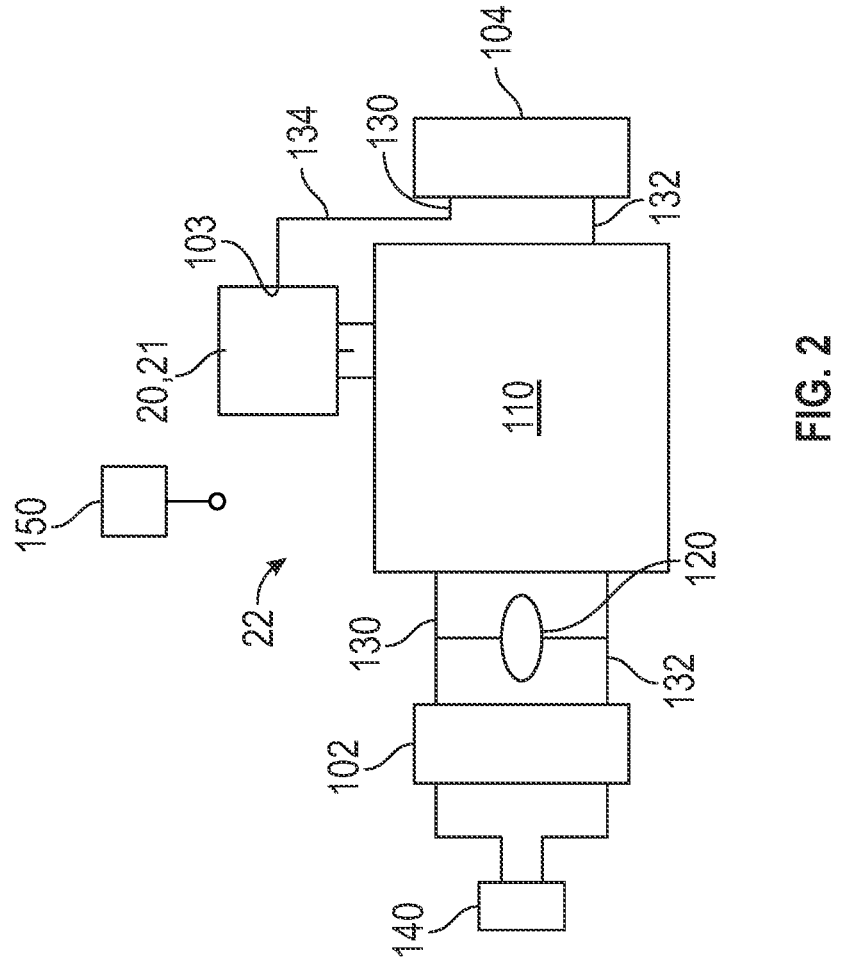
FIG. 2 is a block diagram of a battery system according to one embodiment.
Figure 3:
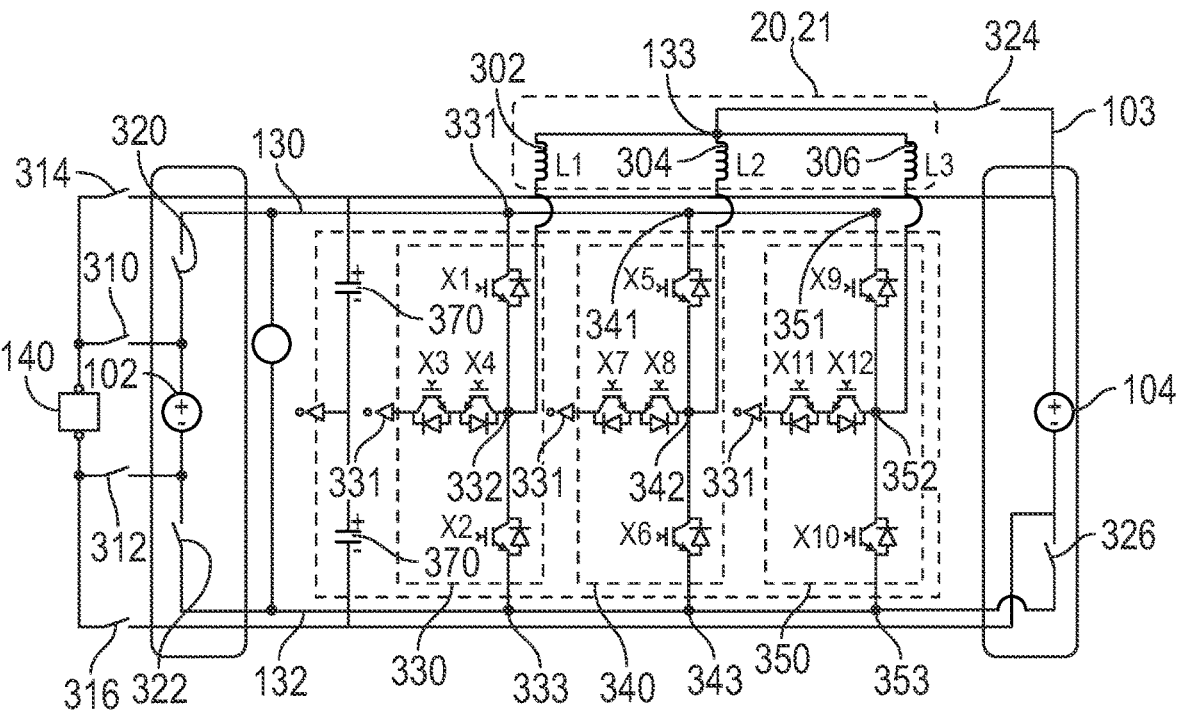
FIG. 3 is a circuit diagram representation of the power transfer method applied to parallel arranged battery packs according to a first example.
Figure 4:
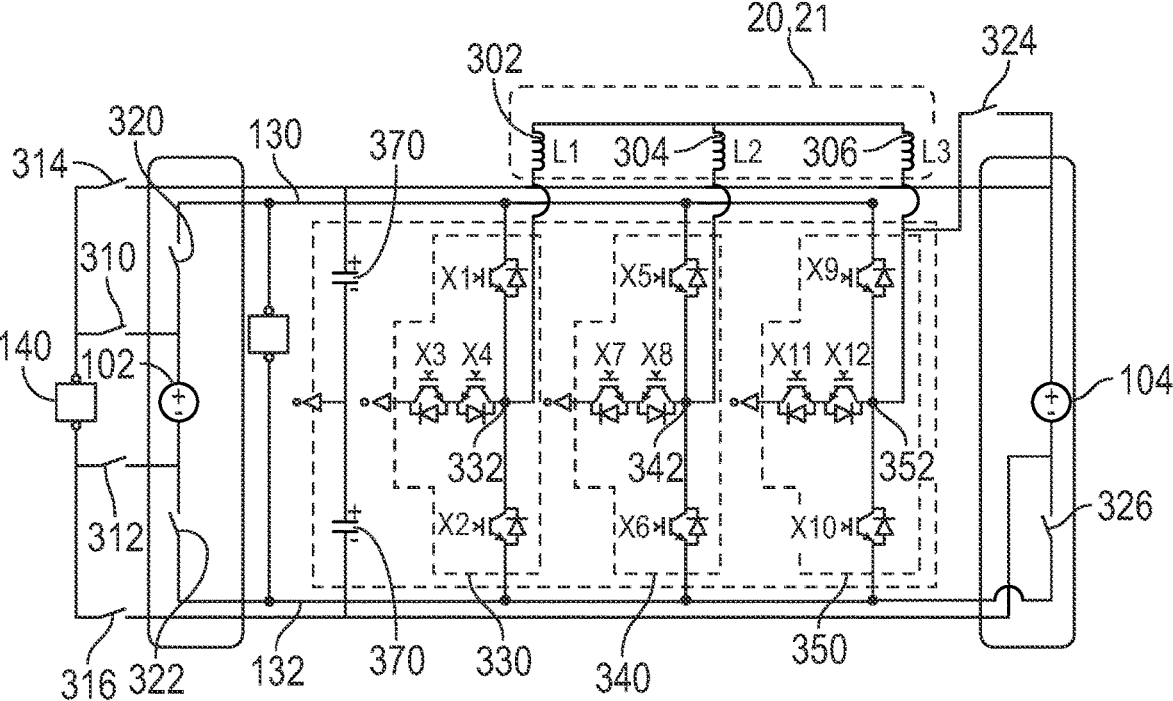
FIG. 4. is a circuit diagram representation of the power transfer method applied to parallel arranged battery packs according to a second example.

With continued reference to FIG. 1, FIG. 2 illustrates a general block diagram of the battery system 22 including a first battery pack 102 and a second battery pack 104. FIGS. 3 and 4 illustrate specific examples of the general block diagram of FIG. 2. The first and second battery packs 102, 104 are in parallel and are connected via a multi-level inverter 110. The multi-level inverter 110 is connected to each inverter leg of a motor 20, 21 and provides operational AC power to the motor 20, 21 from a positive bus 130 during standard operations. In addition to the DC-DC converter 110, a load 120 can be connected across a positive bus 130 and a neutral bus 132 to receive power from the battery packs 102, 104. In some examples, such as the illustrated example of FIG. 2 and the specific example of FIG. 3, the motor 20, 21 has a wye leg configuration (alternately referred to as a four terminal motor) with a neutral node 103 connected to the positive bus 130 via a connection 134. In other examples, such as the specific example of FIG. 4, the motor 20, 21 has a delta leg configuration (alternately referred to as a three terminal motor) with a floating neutral point (i.e., there is no internal connection of the motor legs to a neutral or reference voltage). The battery system 22 can be connected to a charger 140, such as a wall charger, and the charger 140 allows power to be provided to the battery system 22 for charging the battery packs 102, 104.

The battery system 22 includes mixed chemistry battery packs 102, 104, which can include a mix of fuel cells, lithium (Li) ion packs, and any similar batter types. Each battery pack 102, 104 includes a single chemistry, and the chemistry of each battery pack 102, 104 is different from the chemistry within the other battery pack 102, 104. The mixed chemistries provide battery packs 102, 104 with distinct power characteristics with some battery packs 102, 104 having a faster charge rate and a lower power density and other battery packs 102, 104 having a slower charge rate and a higher power density. Due to the varying charge rates and power densities, passive balancing by placing the packs in parallel with a filtering inductor as is done for existing battery systems cannot redistribute power properly from one battery pack to the other battery pack.

To properly balance the battery packs 102, 104 during charging and/or immediately after charging is completed, the battery system 22 includes a battery system controller 150. In some examples the battery system controller 24 of FIG. 1 can provide the functions of the battery system controller 150, and in other embodiments the functions are provided by a dedicated controller 150, distributed across multiple vehicle controllers, or any similar control scheme. It is appreciated that reference herein to the controller 150 encompasses the variety of controller types and configurations and is not limited to the illustrated dedicated battery system controller 150.

During charging, or immediately after charging, the battery packs 102, 104 can be imbalanced, or one battery pack may charge faster than the other. When this happens it is desirable to transfer power from one battery pack 102, 104 to the other battery pack 102, 104. As the process described herein utilizes the motor 20, 21 in a non-rotational capacity it may not be suitable for use during vehicle operation depending on the function of the motor. As the battery packs 102, 104 are different chemistries having different power density and charging characteristics, a DC-DC converter is required to transfer the power from one battery pack 102, 104 to the other battery pack 102, 104. The controller 150 is configured to utilize switches connecting the charger 140 to the battery packs 102, 104, operating the inverter 110 in a DC-DC converter mode and utilizing the inherent inductance of the motor legs in the motor 132 to pass power from one battery pack 102, 104 to the other battery pack 102, 104 without generating rotational motion within the motor.

By modulating the switching of each inverter leg such that the switching in the leg is 180 degrees offset from the other two legs, power passes through each motor leg. This allows the inductance of each motor leg to operate as the DC-DC converter inductor for the corresponding inverter leg of the AC inverter 110. Modulation of the switches in each inverter leg of the AC inverter 110 to achieve the DC-DC converter operation occurs according to known techniques.

With continued reference to FIG. 2, FIG. 3 illustrates a more detailed example implementation of the power system of FIG. 2. The motor 20, 21 is arranged in a wye configuration (alternatively referred to as a four terminal motor 20, 21). Each motor leg of the motor 20, 21 is illustrated as an inductor 302, 304, 306 representing the internal inductance of that motor leg of the motor 20, 21. The charger 140 is connected to the first battery pack 102 via a first pair of switches 310, 312 and connected to the second battery pack 104 via a second pair of switches 314, 316. One switch 310, 314 in each pair of switches connects the positive terminal of the charger 140 to the corresponding battery pack 102, 104 and a second switch 312, 316 connects the negative terminal of the charger 140 to the corresponding battery pack 102, 104.

Additionally, the first battery pack 102 is connected to the positive bus 132 via a switch 320 and to the negative bus 134 via a switch 322. The second battery pack 104 incudes a connection to the positive bus 130 through switches 310, 314, 320, and a switch 324 connects the positive side of the second battery pack 104 to a motor neutral point 133 via a neutral node 103. The negative side of the second battery pack 104 is connected to the negative bus 132 via a switch 324.

Figure 5:
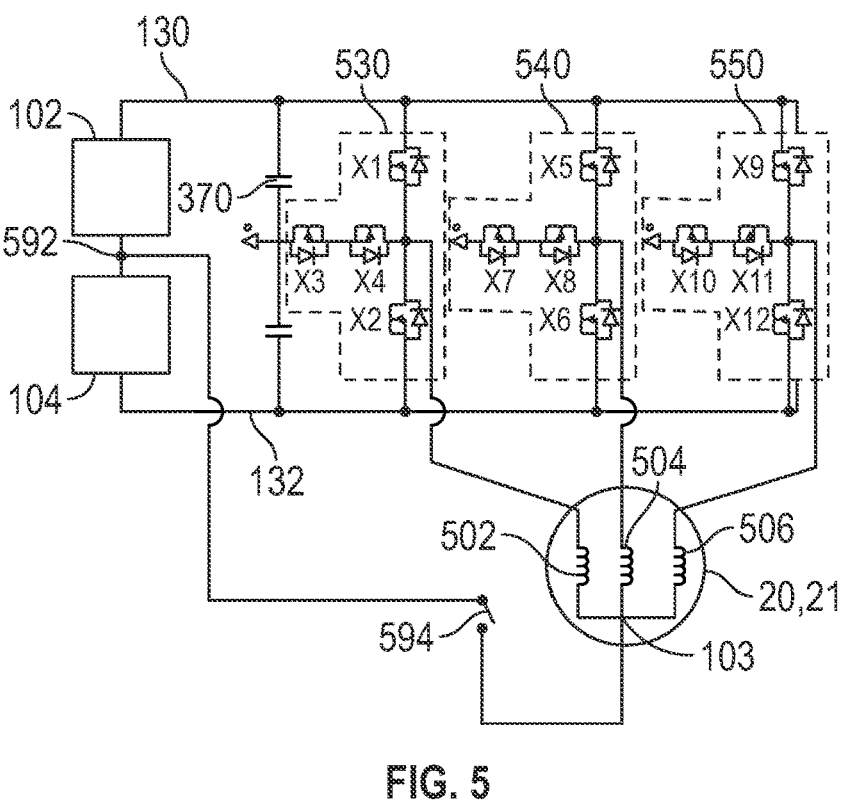
FIG. 5 is a circuit diagram of the power transfer method applied to series arranged battery packs according to a first example.
Figure 6:
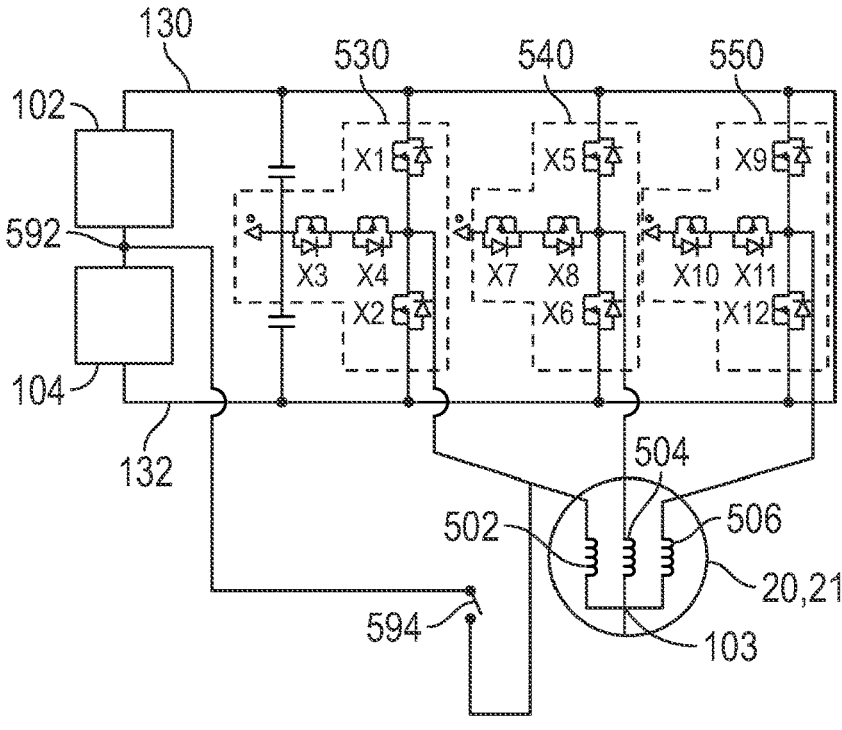
FIG. 6 is a circuit diagram of the power transfer method applied to series arranged battery packs according to a second example.

The AC inverter 110 is arranged in a multi-level T-type inverter topology including three inverter legs 330, 340, 350. Each inverter leg 30, 340, 350 has a first transistor X1, X5, X9 connecting a positive node 331, 341, 351 to an AC output node 332, 342, 352, a second transistor X2, X6, X10 connecting the AC output node 332, 342, 352 to a low node 333, 343, 353, and a pair of third and fourth transistors X3, X4, X7, X8, X11, X12 connecting the AC output node 332, 342, 352 to the mid-point 331 of the DC Link. In the interest of clarity, certain numerals identifying elements of the inverter legs 330, 340, 350 in FIGS. 3 and 4, and the corresponding inverter legs 530, 540, 550 of FIGS. 5 and 6 are omitted after FIG. 3. Absence of a particular numerical callout in FIGS. 4, 5 and 6 should not be construed as an indication that the element is not present, but rather as an indication that the element is in an identical position are in FIG. 3.

The AC output node 332, 342, 352 of each inverter leg 330, 340, 350 is connected to a corresponding motor leg 302, 304, 306 the motor 20, 21. During typical operation, the controller 150 modulates the transistors X1, X2, X3, X4, X5, X6, X7, X8, X9, X10, X11, X12 within each inverter leg 330, 340, 350 of the AC inverter 110 to drive the motor 20, 21 using whichever battery pack 102, 104 is connected to the positive bus 130 and the negative bus 132. A pair of capacitors 370 is connected parallel to the legs 330, 340, 350 of the inverter.

During charging, or shortly thereafter, it is desirable to balance the power between the battery packs 102, 104 or transfer power from one of the battery packs 102 to the other battery pack 104. By way of example when a first battery pack has a low power density but a high charge rate, it may be beneficial to transfer accumulated power from the faster charging battery pack 102 to the slower charging battery pack 104 in order to expedite the overall charging process.

The balancing and power transfer is achieved by modulating the transistors X1, X2, X3, XC4, X5, X6, X7, X8, X9, X10, X11, X12 in the AC-inverter 110 such that the AC inverter operates as a DC-DC inverter using the internal inductances of the motor legs 302, 304, 306 as the corresponding DC-DC converter inductors. In this mode each of the switches 310, 312, 314, 316 connecting the battery packs 102, 104 to the charger 140 are opened, and the switches 320, 322, 324, 326 connecting both battery packs to the positive and negative busses 130, 132 are closed. Each inverter leg 330, 340, 350 is modulated at a phase 120 degrees offset from each other inverter leg 330, 340, 350, thereby allowing power to pass through the motor 20, 21 with a net zero rotational force generation and enabling the motor leg 302, 304, 306 inductances to be utilized.

While in this configuration, energy circulates through the motor legs 302, 304, 306 and the corresponding inverter legs 330, 340, 350. The inverter legs 330, 340, 350 converts the DC power to a voltage and current level that can be accepted by the receiving battery pack 102, 104. The power with the new characteristic is provided to the power bus 130, 132, allowing power to be transferred from one battery pack 102, 104 to the other battery pack 102, 104.

In addition, as each battery pack 102, 104 is connected to both power busses 130, 132, and the charger 140, via switches 320, 322, 326, 328, the controller 150 can isolate, or remove, a single battery pack 102, 104 while one of the battery packs 102, 104 is in a fault condition. To isolate the faulty battery pack 102, 104 the corresponding switches 320, 322, 326, 328 connecting that battery pack 102, 104 to the busses 130, 132 are maintained open, resulting in the battery pack 102, 104 being electrically isolated.

With reference to FIG. 4, when the motor 20, 21 is configured in a delta configuration, there is no neutral point within the motor 20, 21 that the switch 326 can connect to. This configuration is illustrated in FIG. 4, where like numerals with FIGS. 2 and 3 indicating like elements and configurations. Structurally, the example of FIG. 4 varies from that of FIG. 3, only in that the switch 326 connects to the neutral point 352 of one of the inverter legs 350 of the AC inverter 110.

While operating in the DC-DC converter mode, the transistors X9, X10, X11, X12 within the inverter leg 350 are held open, and the inverter 110 is operated as a two-phase DC-DC converter with the other two inverter legs 330, 340 being modulated 180 degrees offset from each other. While in this mode, the power passes through the motor leg 306 corresponding to the inverter leg 350 that is switched off, resulting in the power passing through the motor leg 306 and each other inverter leg 330, 340 as the inverter legs 330, 340 are modulated to create DC power of the appropriate power characteristic. In this mode, the power from the second battery pack 120 is passed through the switch 326 and flows through the third motor leg 306 of the motor 20, 21 into each of the other motor leg 302, 304 of the motor 20, 21. The energy is passed through the inverter legs 330, 340 and provided to the first battery pack 102.

In the example of the delta motor, it is beneficial in some examples to ensure that the motor leg that is not operated during the DC-DC motor is the motor leg that is physically closest to the series arranged battery packs 402, 404. In some configurations this motor leg is between the series arranged battery packs 402, 404 and the other motor legs. Utilizing the motor leg physically closest to the battery packs 402, 404 provides thermal separation between the battery packs 402, 404 and the operating motor legs minimizing the chances of excess heating.

In some instances, the distinct chemistry battery packs may be arranged in series between a positive bus and a negative bus. Such examples are illustrated in FIGS. 5 and 6, with FIG. 5 illustrating a connected wye motor 20, 21 and FIG. 6 illustrating a connected delta motor 20, 21. The inverter legs 530, 540, 550 illustrated in FIGS. 5 and 6 are arranged identically as those illustrated in FIGS. 3 and 4.

With reference to FIG. 5 specifically, the two sets of battery packs 102, 104 are connected in series across a positive bus bar 130 and a negative bus bar 132, with a positive terminal of the second battery pack 104 being connected to a negative terminal of the first battery pack 102 at a battery pack connection node 592. The battery pack node 592 is connected to a neutral node 103 of the motor 20, 21 via a switch 594. While the inverter legs 530, 540, 550 are being driven in DC-DC converter mode, the switch 594 is closed which creates a current circulation path between the battery packs 102, 104 with each motor leg 502, 504, 506 of the motor 20, 21 providing the internal leg inductance and the switches of the corresponding inverter leg 530, 540, 550 (with motor leg 502 corresponding to inverter leg 530, motor leg 504 corresponding to inverter leg 540, and motor leg 50 corresponding to inverter leg 550) being modulated 120 degrees offset from each other inverter leg 530, 540, 550. The current circulation between the battery packs 102, 104 in this mode equalizes the charge in each battery pack 102, 104, and the mode can be used during, or after, series charging of the battery packs 102, 104.

With continued reference to FIGS. 1-5, FIG. 6 schematically illustrates the series connected battery packs 102, 104 with a motor 20, 21 having a delta configuration instead of a wye configuration. In the delta configuration the battery pack node 592 is connected to one of the motor legs 502. When the switch 594 is closed while the switches in each inverter 110 leg 530, 540, 550 is operated as a DC-DC converter, the switch 594 creates a current circulation path from the second battery back 104 through the first motor leg 502 and into each of the second and third motor legs 504, 506, then back into the first battery pack 102. Each of the second and third motor legs 504, 506 are modulated with a phase shift that is offset from the other motor leg 504, 506 by 180 degrees in order to ensure that the motor 20, 21 does not rotate. While the switch 594 is closed (allows current to pass) the charge level between the two battery packs 102, 104 equalizes.

In each of the above examples, the distinct chemistry battery packs 102, 104 are illustrated as single battery packs. It is appreciated that each single battery pack 102, 104 can be replaced with a set of series arranged sub-battery packs, provided each series arranged sub battery pack includes an identical chemistry to each other series arranged sub battery pack in the battery pack 102, 104. In some instances, the sub-battery packs can have identical storage capacity. In other examples, the sub-battery packs can have distinct storage capacities. In any configuration, the total capacity of the battery pack 102, 104 is the sum of the sub battery packs capacity.

Following is a specific example control schemes for a Wye/four terminal motor 20, 21 (FIGS. 3 and 5).

With continued reference to FIGS. 3 and 5 (four terminal motors 20, 21) controlling the multi-level inverter 110 as a DC-DC converter includes providing a first control signal to the first transistor X1, X5, X9 and the second transistor X2, X6, X10 of each inverter leg 330, 530, 340, 540, 350, 550, with the first control signal being inverted for the first transistor X1, X5, X9. A second control signal is provided to the third transistor X3, X7, X11 and the fourth transistor X4, X8, X12, with the second control signal being inverted for the third transistor X3, X7, X11 of each inverter leg 330, 530, 340, 540, 350, 550. The first control signal is modulated with a Pulse Width Modulation to achieve the DC-DC converter operation using the first and second transistors X1, X2, X5, X6, X9, X10 and with each inverter leg 330, 530, 340, 540, 350, 550 being phase shifted from each other inverter leg 330, 530, 340, 540, 350, 550 by 120 degrees. The modulation of the first and second control signals is done according to typical three-phase DC-DC converter operations.

Following is a specific example control scheme for a delta/three terminal motor 20, 21 (FIGS. 4 and 6).

With continued reference to FIGS. 4 and 6, (three terminal motors 20, 21) controlling the multi-level inverter 110 as a DC-DC converter includes, for each of a first inverter leg 340, 530 and second inverter leg 350, 550 providing a first control signal to the first transistor X1, X5 and the second transistor X2, X6 of each of the first and second inverter leg 340, 540, 350, 550 with the first control signal being inverted for the second transistor X2, X6. A second control signal is provided to the third transistor X7, X11 and the fourth transistor X8, X12 of the first and second inverter leg 240, 350, 530, 550, with the second control signal being inverted for the fourth transistor X8, X12 of each of the first and second inverter leg 340, 540, 350, 550. The first control signals and the second control signals control an open/closed state of the first, second, third and fourth transistors X5, X6, X7, X8, X9, X10, X11, X12 of the corresponding inverter leg 304, 504 via pulse width modulation (PWM). The modulation of the control signals for each of the first and second leg inverter 340, 540, 350, 550 is phase shifted from the other inverter leg 340, 540, 350, 550 by 180 degrees.

In addition, in the three-terminal example, a third control signal is provided to the first, second, third and fourth transistor X1, X2, X3, X4 of third inverter leg 530. The third control signal sets the first, second, third, and fourth transistor X1, X2, X3, X4 to off for a duration of controlling the multi-level inverter as the DC-DC converter.

The systems of FIGS. 2-6 illustrate an apparatus and method to provide power transfer bidirectionally between mixed chemistry battery packs 102, 104 (e.g. mix of energy and power packs/modules, fuel cell and Li ion packs) using a multilevel T-type inverter drive system as a DC-DC converter (using an non-rotating motor and multi-level inverter during steady driving or any non-rotating motor and multi-level inverter during stationary condition). While operating as the DC-DC converter, the machine winding inductances of each motor leg 302, 304, 306, 502, 504, 506 of the non-rotating motor 20, 21 along with the respective inverter leg 330, 340, 350, 530, 540, 550 act as synchronized or an interleaved two phase multi-level boost converter (DC-DC converter), with the winding inductance of the third motor leg providing additional boost and filtering action.

As used herein "first", "second", "third" inverter legs are arbitrary designators for distinguishing the operations of the inverter legs 330, 340, 35, 530, 540, 550 and do not imply any unstated positional or operational parameters.

A new control scheme is incorporated into the controller (150, see FIG. 2) for operating the multi-level inverter in the DC-DC mode. The control scheme controls an ON/OFF conditions to control the power flow in either direction through the non-rotating motor and the multi-level inverter. A charge port can be used to continuously charge either battery pack and the DC-DC converter mode can be used to simultaneously charge the first battery pack from charge port and the second battery pack from the first battery pack using the DC-DC mode of the multi-level inverter motor system. In some examples, the switches in the muti-level inverter are insulated gate bipolar transistors (IGBTs) with antiparallel diodes or Si/SiC/GaN field effect transistors (FETs). In some examples, the new control scheme is entirely software based and can be retroactively added to existing controllers and applied in an existing motor vehicle without requiring replacement or reconfiguring of parts. In some examples, certain switches X3, X4, X7, X8, X11, X12 for each inverter leg could be replaced by reverse blocking anti-series IGBTs or MOSFETS and controlled appropriately. These switches X3, X4, X7, X8, X11, X12 can be alternately referred to as auxiliary switches.

The charging balance or power transfer configuration can either be used for single port or multi-port charging events. All (in the case of a four terminal motor) or select (in the case of a three terminal motor) phases are modulated using logic with a pre-determined phase-shift (e.g., 180 degrees for a four terminal motor or 120 degrees for a three terminal motor) from each other phase. The phase shift is achieved using a pulse width modulation (PWM) control of the internal switches. The duty cycle and phase relationship between the internal switches is selected to achieve the boost or buck function of the DC-DC converter with power flow in the required direction (e.g., from the first battery pack to the second battery pack) while avoiding short circuiting the main bus. The PWM frequency, duty cycle and phase shift between the switching inverter legs are functions of the charging power and current ripple to be achieved during charging operation, and can be determined by one of skill in the art.

In an example with series arranged battery packs (e.g. FIGS. 5 and 6), a multilevel T-type inverter 110 and the corresponding motor windings 502, 504, 506) of the motor 20, 21 are used to actively balance the state of charge of two battery packs 102, 104 during or after series charging. The second battery pack 102 is continuously charged until a difference of state of charge of the two battery packs 102, 104 is smaller than a predefined threshold. A four-terminal machine example use a switch to connect the mid-point of the battery back and the neutral point of the four terminal winding machine. A three-terminal machine example uses a switch to connect the mid-point of the battery packs and one leg terminal of a three-terminal machine.

In one variation on the three-terminal motor, the inactive inverter leg of the inverter 110 can be switched out of the circuit using dedicated switches, rather than controlling the transistors within the inactive inverter leg to be held open.

Figure 7:
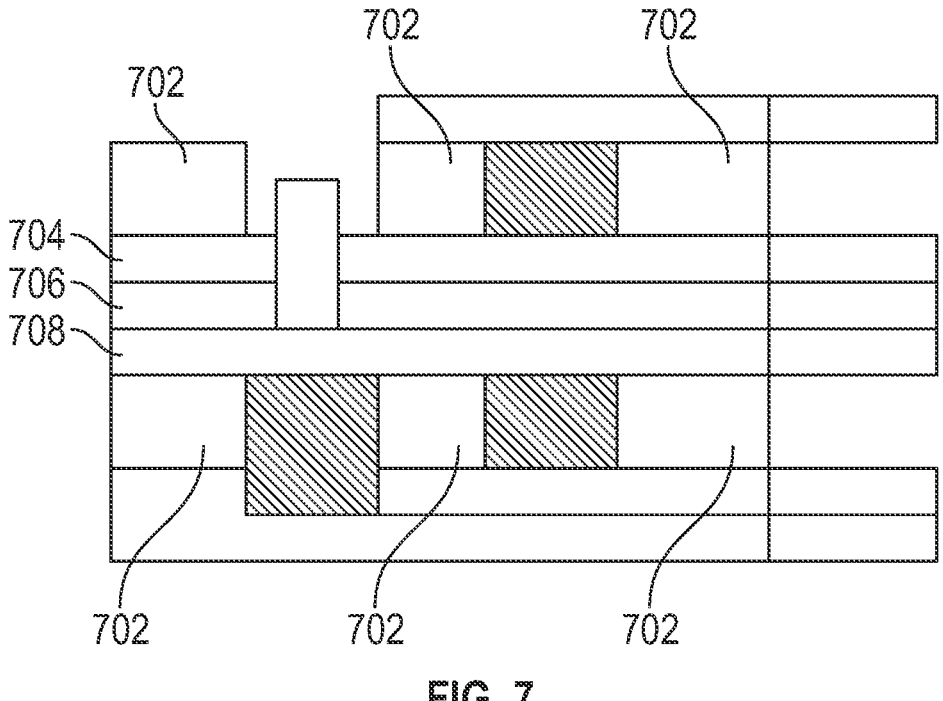
FIG. 7 is an exemplary physical capacitor mount configuration according to one example.
Figure 8:
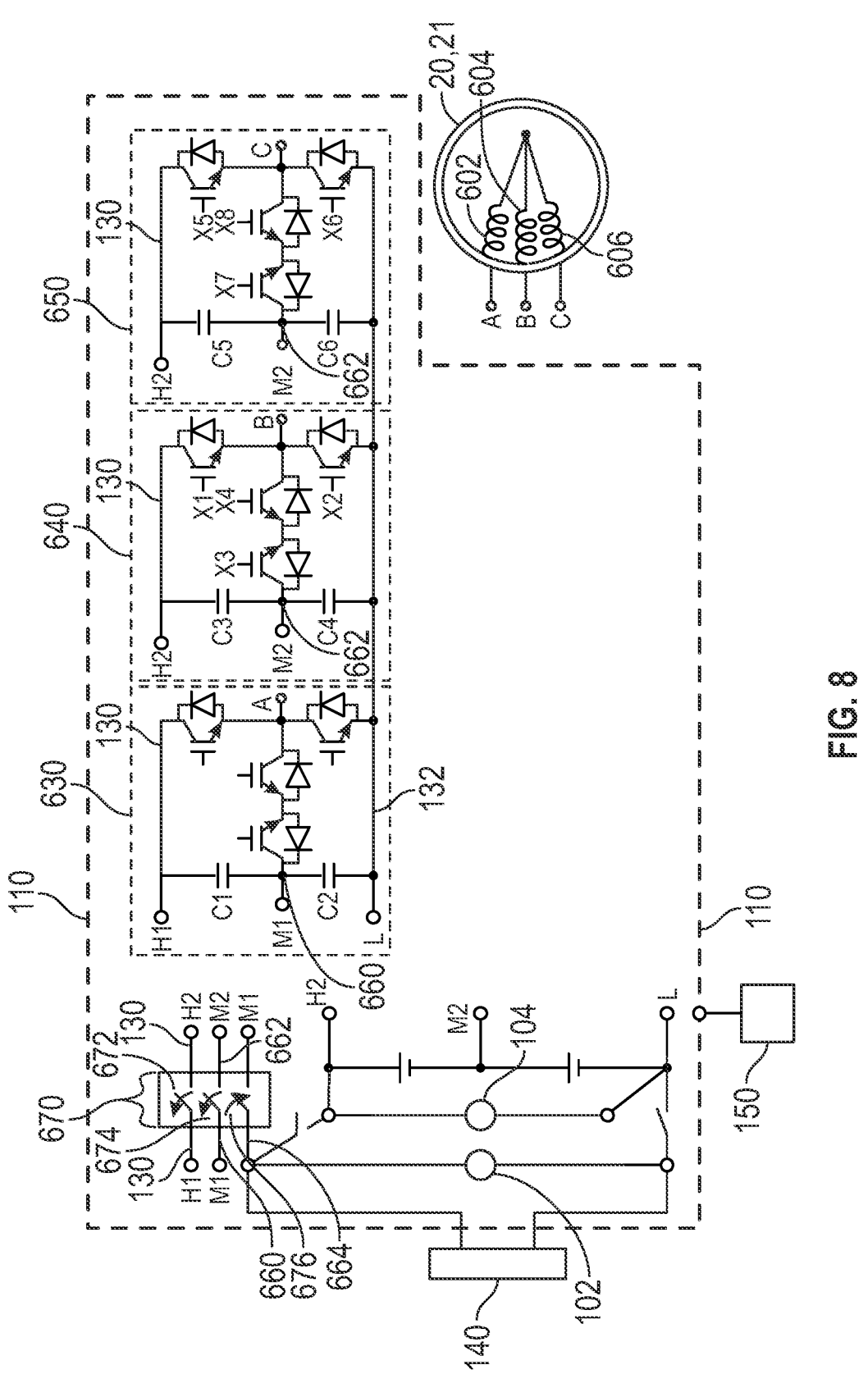
FIG. 8 is an exemplary circuit diagram of the power transfer method applied using a three terminal motor and the capacitor mount configuration of FIG. 7.

FIG. 8 illustrates one such example, while FIG. 7 illustrates an example capacitor mount configuration that can be utilized in one embodiment of the variation shown in FIG. 8. Structurally, the example of FIG. 8 varies from that of FIG. 4 in that the positive DC bus 130 and negative DC bus 132 include a switched connection 670 (illustrated via sub diagram 680) configured to disconnect one of the inverter legs 620, 630, 640 (620 in the illustrated configuration) from the positive DC bus 130 using a first switch 672 for a duration of the operations as a DC-DC converter.

A second switch 674 disconnects a return node 660 of the inverter leg 620 from the return node 660 of each of the other inverter legs 640, 650 for a duration of the operations as a DC-DC converter. The first switch 672 and the second switch 674 can receive the same control signal and will always be in the same state. In addition, a third switch 676 connects the return node 660 of the inverter leg 630 to the positive terminal of the battery 102 for the duration of the operations as a DC-DC converter. This switching arrangement allows the power to flow from the battery 102 through the first inverter leg 630 to the motor inductor 602 corresponding to the first inverter leg 630, and then through the motor to the other two inverter legs 640, 650 operating as the DC-DC converter.

As with the examples of FIGS. 4 and 6, the inverter 110 is operated as a two-phase DC-DC converter with the other two inverter legs 530, 540 being modulated 180 degrees apart. While in this mode, the second and third inverter leg 540, 550 are modulated to create DC power of the appropriate power characteristic. A capacitor mount 700 is illustrated in FIG. 7 with six capacitors 702 mounted to three parallel bus bar plates 704, 706, 708. The capacitor mount configuration of FIG. 7 with six capacitors 702 minimizes loop inductance and improves performance while operating in the DC-DC converter mode.

In some examples, multiple multilevel inverter units can be used to share power that is being transferred to another pack. In addition, an N-level inverter can be used to further reduce the voltage and thermal stresses in dc-dc operation. The control scheme for this function includes continuous battery SOC and energy monitoring for turning off the charging current and commanding contactor/switch turn-off. The high voltage lines might have additional voltage and/or current sensors/pyro fuse for diagnostics and safety of that high voltage line. The main contactors associated with each pack may also include a pre-charge device in parallel with one main contactor.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle system comprising;
a first battery pack connected to a second battery pack via T-type multi-level inverter having a plurality of inverter legs, with each inverter leg being arranged in a T-type topology, the first battery pack having a first chemistry and the second battery pack having a second chemistry, distinct from the first chemistry, and wherein the first chemistry and the second chemistry have different power densities and different charging characteristics;
a motor connected to the T-type multi-level inverter;
a controller connected to the motor and the T-type multi-level inverter, the controller including a memory storing instructions configured to cause the controller to control the T-type multi-level inverter as a direct current (DC)-DC converter such that a circulating current passes through the motor, the first battery pack and the second battery pack by controlling a phase shift in a modulation of the T-type multi-level inverter while the T-type multi-level inverter is operating as a DC-DC converter such that rotational forces generated by current passing through the leg are directly countered by rotational forces generated by the current passing through other legs of the motor.

2. The vehicle system of claim 1, wherein each inverter leg of the T-type multi-level inverter comprises a first transistor connecting a positive node to a corresponding AC output node, a second transistor connecting the corresponding AC output node to a low node, a pair of third and fourth transistors connecting the corresponding AC output node to a midpoint of a pair of DC link capacitors; and
wherein each phase of the motor is connected to a corresponding leg of the T-type multi-level inverter.

3. The vehicle system of claim 2, wherein the motor is a four terminal motor, and wherein controlling the T-type multi-level inverter as a DC-DC converter comprises:
providing a first control signal to the first transistor and the second transistor of each inverter leg with the first control signal being inverted for the second transistor of each inverter leg;
providing a second control signal to the third transistor and the fourth transistor of each inverter leg, with the second control signal being inverted for the fourth transistor; and wherein, the first control signal is modulated with a three phase DC-DC converter Pulse Width Modulation (PWM), with the PWM of each inverter leg being phase shifted from each other inverter leg by 120 degrees.

4. The vehicle system of claim 2, wherein the motor is a three terminal motor, and wherein controlling the multi-level inverter as a DC-DC converter comprises:
for each of a first inverter leg and a second inverter leg, providing a first control signal to the first transistor and the second transistor of each of the first inverter leg and second inverter leg with the first control signal being inverted for the first transistor of each inverter leg;
providing a second control signal to the third transistor and the fourth transistor of the first inverter leg and second inverter leg with the second control signal being inverted for the third transistor of each of the first and the second inverter leg;
wherein the first control signals and the second control signals control an open/closed state of the first, second, third and fourth transistor of the corresponding phase via Pulse Width Modulation (PWM);
wherein the modulated first control signal and the modulated second control signal in each inverter leg are phase shifted from the other leg's first modulated control signal and second modulated control signal by 180 degrees;
wherein a third control signal is provided to the first, second, third and fourth transistor of a third inverter leg, the third control signal setting the first, second, third, and fourth transistor to off for a duration of controlling the T-type multi-level inverter as the DC-DC converter, wherein the third inverter leg is connected to a positive terminal of the first battery pack.

5. The vehicle of claim 2, wherein the motor is a three-terminal motor, and wherein a first leg of the plurality of inverter legs is connected to a positive DC bus via a first switch, a neutral return node of the first inverter leg is connected to a neutral via a second switch, and connected to a positive terminal of the first battery pack via a third switch.

6. The vehicle system of claim 2, wherein the first battery pack comprises at least a first set of power cells and a second set of power cells connected to the first set of power cells at the low node.

7. The vehicle system of claim 1, wherein the first battery pack and the second battery pack are connected in parallel at one or both of a negative battery terminal and a positive battery terminal.

8. The vehicle system of claim 1, wherein the first battery pack and the second battery pack are connected in series via a common node.

9. The vehicle system of claim 8, wherein a neutral node connecting each phase of the motor is connected to the common node of the first battery pack and the second battery pack.

10. The vehicle system of claim 8, wherein a phase terminal of the motor is connected to the common node of the series connected battery packs.

11. The vehicle system of claim 10, wherein the motor is a three-terminal motor and a first inverter leg is physically disposed closer to the first battery pack and closer to the second battery pack than each of a second inverter leg and a third inverter leg, and wherein the first inverter leg is connected to a positive terminal of the battery pack during DC-DC converter operations.

12. The vehicle system of claim 1, wherein the motor is configured in a delta configuration.

13. A method for transferring power between a first battery pack and a second battery pack of a vehicle system comprising:

causing a controller to control a T-type multi-level inverter as a direct current (DC)-DC converter such that a circulating current passes through the T-type multi-level inverter, a motor having three phases, a first battery pack and a second battery pack by controlling a phase shift in a modulation of the T-type multi-level inverter while the T-type multi-level inverter is operating as a DC-DC converter such that rotational forces generated by current passing through the leg are directly countered by rotational forces generated by the current passing through other legs of the motor, the first battery pack having a first chemistry and the second battery pack having a second chemistry, distinct from the first chemistry, and wherein the first chemistry and the second chemistry have different power densities and different charging characteristics;

wherein the vehicle system comprises the first battery pack being connected to the second battery pack via the T-type multi-level inverter;

wherein the motor is connected to the T-type multi-level inverter; and wherein a motor controller is connected to the motor and the T-type multi-level inverter, the motor controller including a memory storing instructions configured to cause the vehicle system to implement the method.

14. The method of claim 13, wherein the T-type multi-level inverter includes three inverter legs, each inverter leg comprising a first transistor connecting a positive node to an AC output node, a second transistor connecting the AC output node to a low node, a pair of third and fourth transistors connecting the AC output node to midpoint of a pair of DC Link capacitors; and wherein each phase of the motor is connected to a corresponding leg of the T-type multi-level inverter.

15. The method of claim 14, wherein the motor is a four terminal motor, and wherein controlling the T-type multi-level inverter as a DC-DC converter comprises:

providing a first control signal to the first transistor and the second transistor of each inverter leg with the first control signal being inverted for the second transistor;

providing a second control signal to the third transistor and the fourth transistor of each inverter leg, with the second control signal being inverted for the fourth transistor; and wherein the first control signal is modulated with a three phase DC-DC converter Pulse Width Modulation (PWM), with the PWM of each inverter leg being phase shifted from the PWM of each other inverter leg by 120 degrees.

16. The method of claim 14, wherein the motor is a three terminal motor, and wherein controlling the T-type multi-level inverter as a DC-DC converter comprises:

for each of a first inverter leg and a second inverter leg, providing a first control signal to the first transistor and the second transistor of each of the first inverter leg and the second inverter leg with the first control signal being inverted for the first transistor of each of the first inverter leg and the second inverter leg;

providing a second control signal to the third transistor and the fourth transistor of the first inverter leg and the second inverter leg with the second control signal being inverted for the third transistor of each of the first and second inverter leg;

wherein the first control signals and the second control signals controlling an open/closed state of the first, second, third and fourth transistor of the corresponding phase via Pulse Width Modulation (PWM);

wherein the modulated first control signal and the second control signal in each inverter leg are phase shifted from the other leg's first control signal and second control signal by 180 degrees; and providing a third control signal to the first, second, third and fourth transistor of a third inverter leg, the third control signal setting the first, second, third, and fourth transistor to off for a duration of controlling the T-type multi-level inverter as the DC-DC converter, wherein the third inverter leg is connected to a positive terminal of the first battery pack.

17. The method of claim 13, wherein the first battery pack and the second battery pack are connected in parallel.

18. The method of claim 13, wherein the first battery pack and the second battery pack are connected in series via a battery node.

19. A vehicle comprising:

an electric drive system comprising at least one electric motor having three phases;

a power distribution system comprising at least a first battery pack and a second battery pack, the power distribution system being connected to the electric drive system via a T-type multi-level inverter; and a controller connected to the electric motor and the T-type multi-level inverter, the controller including a memory storing instructions configured to cause the controller to control the T-type multi-level inverter as a direct current (DC)-DC converter such that a circulating current passes through the motor, the first battery pack and the second battery pack by controlling a phase shift in a modulation of the T-type multi-level inverter while the T-type multi-level inverter is operating as a DC-DC converter such that rotational forces generated by current passing through the leg are directly countered by rotational forces generated by the current passing through other legs of the motor, the first battery pack having a first chemistry and the second battery pack having a second chemistry, distinct from the first chemistry, and wherein the first chemistry and the second chemistry have different power densities and different charging characteristics.

20. The vehicle of claim 19, wherein the T-type multi-level inverter includes three inverter legs, each inverter leg of the T-type multi-level inverter comprising a first transistor connecting a positive node to an AC output node, a second transistor connecting the AC output node to a low node, a third transistor and a fourth transistor connecting the AC output node to the midpoint of a DC Link capacitor; and wherein each phase of the electric motor is connected to a corresponding inverter leg of the T-type multi-level inverter.

\* \* \* \* \*